United States Patent
Lu (10) Patent No.: US 11,721,110 B2
(45) Date of Patent: Aug. 8, 2023

(54) METHOD, SYSTEM AND COMPUTER PROGRAM PRODUCT FOR PROVIDING DRIVING ASSISTANCE

(71) Applicant: MiTAC Digital Technology Corporation, Taoyuan (TW)

(72) Inventor: Chieh-Wen Lu, Taoyuan (TW)

(73) Assignee: MiTAC Digital Technology Corporation, Taoyuan (TW)

( * ) Notice: Subject to any disclaimer, the term of this patent is extended or adjusted under 35 U.S.C. 154(b) by 161 days.

(21) Appl. No.: 17/028,457

(22) Filed: Sep. 22, 2020

(65) Prior Publication Data

US 2021/0089796 A1    Mar. 25, 2021

(30) Foreign Application Priority Data

Sep. 23, 2019  (TW) .................................. 108134211

(51) Int. Cl.
  *G06V 20/58*    (2022.01)
  *B60W 50/14*    (2020.01)

(52) U.S. Cl.
  CPC ........... *G06V 20/582* (2022.01); *B60W 50/14* (2013.01); *B60W 2050/143* (2013.01)

(58) Field of Classification Search
  CPC .................... B60W 50/14; B60W 2050/143
  See application file for complete search history.

(56) References Cited

U.S. PATENT DOCUMENTS

| | | | |
|---|---|---|---|
| 10,235,976 B2 | 3/2019 | Nishimura | |
| 10,282,985 B2 | 5/2019 | Bjersing | |
| 10,300,853 B2 | 5/2019 | Yokochi et al. | |
| 2012/0313770 A1* | 12/2012 | Zeiger ................... | B60K 35/00 701/2 |
| 2014/0119605 A1 | 5/2014 | Zobel | |
| 2017/0017849 A1 | 1/2017 | Kristensen | |
| 2017/0174132 A1 | 6/2017 | Yokochi et al. | |

(Continued)

FOREIGN PATENT DOCUMENTS

| | | |
|---|---|---|
| CN | 101996483 A | 3/2011 |
| CN | 103034836 B | 3/2016 |
| CN | 107344499 A | 11/2017 |

(Continued)

OTHER PUBLICATIONS

S. Prawitz, "Volkswagen optimiert Verkehrszeichenerkennung," Dec. 16, 2016.

*Primary Examiner* — Nabil H Syed
*Assistant Examiner* — Cal J Eustaquio
(74) *Attorney, Agent, or Firm* — Hammer & Associates, P.C.

(57) ABSTRACT

A method for providing driving assistance is implemented by a driving assistance system and includes the steps of: continuously capturing images of the surrounding environment of the vehicle; performing an image processing procedure on at least one of the images; determining whether a traffic sign indicating a message is detected in the at least one of the images, and whether additional information indicating a condition associated with the message is detected with respect to the traffic sign; determining whether an alert action is to be executed based on the message and a current condition associated with the vehicle; and when the determination is affirmative, executing the alert action.

9 Claims, 5 Drawing Sheets

(56) References Cited

U.S. PATENT DOCUMENTS

2020/0216079 A1* 7/2020 Mahajan .......... B60W 60/0051

FOREIGN PATENT DOCUMENTS

| | | |
|---|---|---|
| CN | 105788323 B | 6/2018 |
| CN | 108597245 A | 9/2018 |
| DE | 102017215138 A1 | 3/2018 |
| EP | 3091524 A1 | 11/2016 |
| EP | 2575077 B1 | 12/2017 |
| JP | 0552999 U | 7/1993 |
| JP | 2019106126 A | 6/2019 |
| TW | 201506860 A | 2/2015 |

* cited by examiner

METHOD, SYSTEM AND COMPUTER PROGRAM PRODUCT FOR PROVIDING DRIVING ASSISTANCE

CROSS-REFERENCE TO RELATED APPLICATION

This application claims priority of Taiwanese Invention Patent Application No. 108134211, filed on Sep. 23, 2019.

FIELD

The disclosure relates to a method, a system and a computer program product for providing driving assistance.

BACKGROUND

Conventionally, traffic signs are regularly erected on roadsides and/or above roads to provide various information or notification to road users (drivers, pedestrians, etc.). The traffic signs may be categorized into a number of types; for example, Annex 1 of Vienna Convention on Road Signs and Signals defines eight categories of signs. Different countries may adopt different types of traffic sign conventions.

It is noted that for some road users, reading the different types of traffic signs may be difficult and distracting, and may potentially increase the risks on the road for these road users.

SUMMARY

Therefore, one object of the disclosure is to provide a method for providing driving assistance.

According to the disclosure, the method is implemented using a driving assistance system that includes a processor and an image capturing unit. The method includes:

a) controlling, by the processor, the image capturing unit to continuously capture images of the surrounding environment of the vehicle;

b) performing, by the processor, an image processing procedure on at least one of the images captured by the image capturing unit;

c) determining, by the processor, whether a traffic sign indicating that a message is detected in the at least one of the images;

d) when the determination in step c) is affirmative, determining, by the processor, whether additional information indicating a condition associated with the message is detected with respect to the traffic sign;

e) determining, by the processor, whether an alert action is to be executed based on at least the message indicated by the traffic sign and a current condition associated with the vehicle, the current condition including one of a current time, a current weather, a movement of the vehicle, and any combination thereof; and f) when the determination in step e) is affirmative, executing, by the processor, the alert action.

Another object of the disclosure is to provide a system that is capable of implementing the above-mentioned method.

According to one embodiment of the disclosure, the driving assistance system includes a processor and an image capturing unit connected to the processor. The processor is programmed to:

control the image capturing unit to continuously capture images of the surrounding environment of the vehicle;

perform an image processing procedure on at least one of the images captured by the image capturing unit;

determine whether a traffic sign indicating a message is detected in the at least one of the images;

when the determination is affirmative, determine whether additional information indicating a condition associated with the message is detected with respect to the traffic sign;

determine whether an alert action is to be executed based on at least the message indicated by the traffic sign and a current condition associated with the vehicle, the current condition including one of a current time, a current weather, a movement of the vehicle, and any combination thereof; and when the determination is affirmative, execute the alert action.

Another object of the disclosure is to provide a computer program product that is capable of implementing the above-mentioned method.

According to one embodiment of the disclosure, the computer program product includes instructions that, when executed by a processor of an in-vehicle driving assistance system, cause the processor to perform steps of the above-mentioned method.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Throughout the disclosure, the term "connected to" may refer to a direct connection among a plurality of electrical apparatus/devices/equipments via an electrically conductive material (e.g., an electrical wire), an indirect connection between two electrical apparatus/devices/equipments via another one or more apparatus/devices/equipments, or wireless communication.

Figure 1:
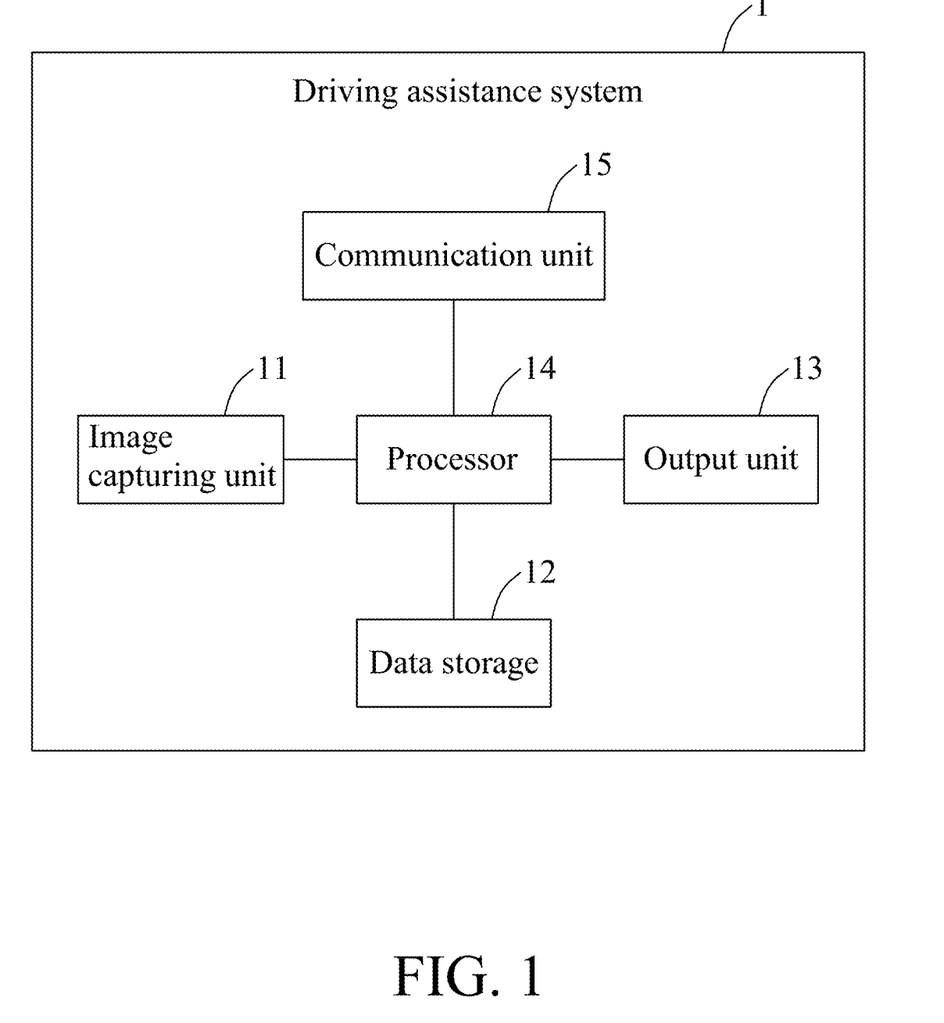
FIG. 1 is a block diagram illustrating a driving assistance system according to one embodiment of the disclosure.

FIG. 1 is a block diagram illustrating a driving assistance system 1 according to one embodiment of the disclosure. In this embodiment, the driving assistance system 1 is disposed in a vehicle (not depicted in the drawings), and includes an image capturing unit 11, a data storage 12, an output unit 13, a communication unit 15, and a processor 14 that is electrically connected to the image capturing unit 11, the data storage 12, the output unit 13, and the communication unit 15.

The image capturing unit 11 may be embodied using a driving video recorder (DVR) with a wide angle lens that is capable of covering an angle of view of at least 120 degrees, and may be disposed in the vehicle to face outside of the vehicle for capturing images of surrounding environment of the vehicle in directions outwardly of the vehicle. In some embodiments, the image capturing unit 11 may include a plurality of DVRs facing different directions, and therefore may be capable of covering the surrounding environment of the vehicle in all directions. In some embodiments, the image capturing unit 11 may be embodied using other types of digital image capturing devices that are capable of capturing images, such as a still camera with a continuous shooting mode (also known as a burst mode) function to rapidly capture a plurality of images in succession.

The data storage 12 may be embodied using flash memory, a hard disk, a solid state disk (SSD) or other types of non-transitory storage medium. The data storage 12 stores a software application, a neural network model for dynamic image recognition, and an optical character recognition (OCR) model. The neural network model for dynamic image recognition may be embodied using a convolutional neural network (CNN).

The software application includes instructions that, when executed by the processor 14, cause the processor 14 to perform a number of functions as described in the succeeding paragraphs. In some embodiments, the content stored in the data storage 12 (i.e., the software application, the neural network model for dynamic image recognition, and the OCR model) may be packed in the form of a computer program product. The dynamic image recognition includes object identification.

In use, the processor 14 executing the software application may be configured to identify a traffic sign in an image, and to detect one or more characters (e.g., word-characters (e.g., Chinese characters), letters, numbers, symbols, etc.) in the traffic sign and/or located in proximity to the traffic sign. Moreover, the processor 14 may be configured to determine a category of the traffic sign based on, for example, a shape and one or more colors of the traffic sign, the characters in the traffic sign and/or located in proximity to the traffic sign, etc.

It is noted that the detection of the traffic signs and the characters using the neural network model for dynamic image recognition and the OCR model are readily known in the related technical fields, and the details thereof are omitted herein for the sake of brevity.

The output unit 13 may be embodied using a display screen, an audio output component, or a combination thereof.

The processor 14 may include, but not limited to, a single core processor, a multi-core processor, a dual-core mobile processor, a microprocessor, a microcontroller, a digital signal processor (DSP), a field-programmable gate array (FPGA), an application specific integrated circuit (ASIC), and/or a system on a chip (SoC), etc. In this embodiment, the data storage 12 and the processor 14 may be integrated in the form of an in-vehicle computer, or a remote server that is in signal connection with the image capturing unit 11 and the output unit 13.

The communication unit 15 may include at least one of a radio-frequency integrated circuit (RFIC), a short-range wireless communication module supporting a short-range wireless communication network using a wireless technology of Bluetooth® and/or Wi-Fi, etc., or a mobile communication module supporting telecommunication using Long-Term Evolution (LTE), the third generation (3G) and/or fifth generation (5G) of wireless mobile telecommunications technology, and/or the like.

In some embodiments, the driving assistance system 1 may be embodied using an electronic device (e.g., a smartphone, a dashboard camera, etc.).

Figure 2:
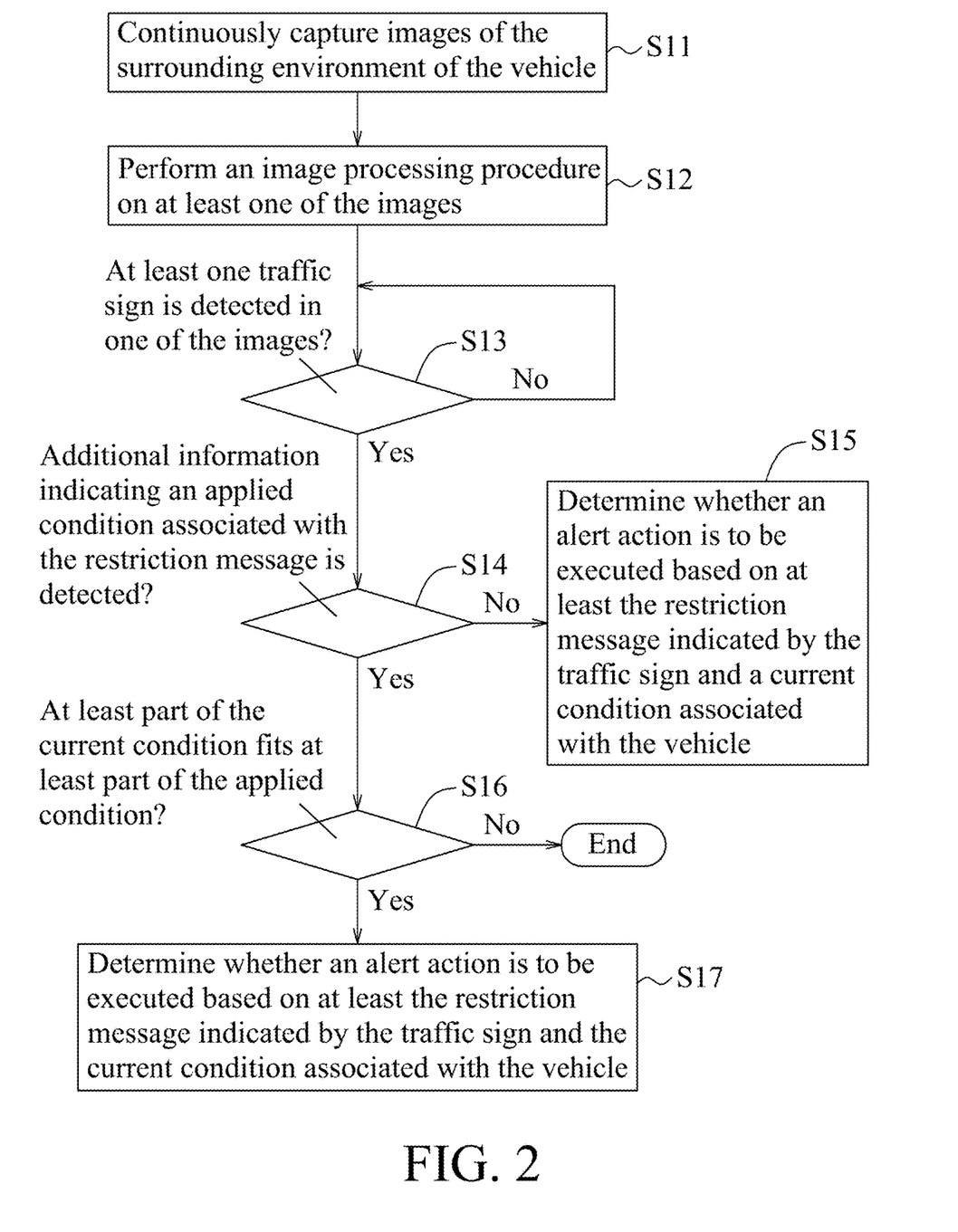
FIG. 2 is a flow chart illustrating steps of a method for providing driving assistance according to one embodiment of the disclosure.

FIG. 2 is a flow chart illustrating steps of a method for providing driving assistance according to one embodiment of the disclosure. In this embodiment, the method is implemented by the driving assistance system 1 as described in FIG. 1.

In use, when the user of the vehicle (e.g., a driver) is driving the vehicle on a road, he/she may operate the driving assistance system 1 to execute the software application. In response, the processor 14 is programmed to control the components of the driving assistance system 1 to perform the steps as described below.

In step S11, the processor 14 controls the image capturing unit 11 to continuously capture images of the surrounding environment of the vehicle. It is noted that in some embodiments, the image capturing unit 11 may be controlled to continuously capture images regardless of the state of motion of the vehicle (e.g., in motion, or idling).

In step S12, the processor 14 performs an image processing procedure on at least one of the images captured by the image capturing unit 11. Specifically, the processor 14 may obtain the images captured by the image capturing unit 11 (the images may be extracted from a video recorded by the DVR and stored in the data storage 12), and proceed to perform dynamic image recognition on the images to identify objects in the images using the CNN model.

In this embodiment, the image capturing unit 11 is capable of capturing images of the surrounding environment of the vehicle in various directions, covering a left-front side of the vehicle, a front side of the vehicle, and a right-front side of the vehicle. In embodiments, the dynamic image recognition may be performed with respect to various portions of the captured images. For example, in this embodiment, the dynamic image recognition may be performed with respect to images of the surrounding environment at one lateral side of the vehicle that is the side of a front-passenger seat (hereinafter referred to as "passenger side"). It is noted that since in different geological regions of the world, the front-passenger seat may be located on different lateral sides in the vehicle, the dynamic image recognition may be performed with respect to different portions of the images depending on the geological region in which this method is performed.

In embodiments, when the vehicle is being driven on a road, one or more traffic signs may be located in the front side or the lateral sides of the vehicle. As such, in step S13, the processor 14 determines whether at least one traffic sign is detected in one of the images, that is, whether the objects identified in step S12 include a traffic sign. A traffic sign may be in the form of a plate, a light device, a display screen or the like, and may contain various types of information, instructions, rules, restrictions, or requirements, etc. In this embodiment, the traffic sign may be restrictive in nature, i.e., it may indicate a message such as a speed limit, a prohibited action, etc. In this embodiment, the processor 14 may perform step S13 by determining whether a flat surface is detected in the images. The presence of a flat surface may indicate that a traffic sign is detected. In other embodiments, various ways that are known in the related art for detecting traffic signs may be employed. After it is determined that a traffic sign is detected, the processor 14 may further identify the content of the traffic sign (i.e., determine the message) using the OCR model or other recognition techniques that are commercially available. In one example, the type of a traffic sign may be determined using a shape and/or a color of the traffic sign (e.g., in Taiwan, a maximum speed limit traffic sign may be in a circular shape with a red outer ring, and a minimum speed limit traffic sign may be in a circular shape with a blue background). After detecting the shape and/or a color of the traffic sign, the processor 14 may further detect the characters on the traffic sign to determine the details included in the traffic sign. For example, the characters "70" on a traffic sign in a circular shape with a red outer ring may indicate that a 70 kilometers per hour maximum speed limit is in effect.

It is noted that, in some embodiments, the processor 14 may be configured to perform the dynamic image recognition with respect to a portion of the image. For example, for one image captured by the image capturing unit 11, the processor 14 may be configured to partition the image into three portions (e.g., a top portion, a middle portion and a bottom portion) and perform the dynamic image recognition with respect to the middle portion of the image. In this manner, the operation of detecting a traffic sign may be done more efficiently as the amount of data needed to be processed by the processor 14 is significantly reduced.

When the determination of step S13 is affirmative, the flow proceeds to step S14. Otherwise, the flow goes back to step S13 periodically to determine whether at least one traffic sign is detected in one of the images subsequently captured by the image capturing unit 11. For example, in this embodiment, when no traffic sign is detected, the processor 14 may perform the detection again after a predetermined time period (e.g., 500 milliseconds).

In step S14, the processor 14 determines whether additional information indicating a condition associated with the message is detected in relation to the traffic sign (e.g., the conditions may be in the traffic sign itself or in proximity to the traffic sign). Essentially, step S14 is to determine whether the traffic sign is a conditional traffic sign meaning that the restriction or requirement or information of the conditional traffic sign only applies if certain condition as described in the traffic sign (or proximate to the traffic sign) is met (e.g., the restriction/requirement/information only applies to a specific type of vehicle, e.g., buses, or the restriction/requirement/information only applies during certain time period(s) of the day (from 6 a.m. to 8 p.m.).

Specifically, in this embodiment, the processor 14 is first configured to define a detection range in said one of the images that is associated with the traffic sign. In this embodiment, the detection range may be in a form of a circle with a center that coincides with a geometric center of the traffic sign in said one of the images. A size of the detection range is positively related to the size of the traffic sign in said one of the images. For example, the size of the detection range may be two times the size of the traffic sign in said one of the images.

Then, the processor 14 determines whether additional information is detected within the detection range. When the determination of step S14 is negative, the flow proceeds to step S15. Otherwise, the flow proceeds to step S16. It is noted that, in this embodiment, the processor 14 is not required to perform the detection with respect to the entirety of the images captured by the image capturing unit 11. In this manner, the operation of determining whether additional information is detected within the detection range may be done more efficiently as the amount of data needed to be processed by the processor 14 is reduced.

In step S15, the processor 14 determines whether an alert action is to be executed based on at least the message indicated by the traffic sign and a current condition associated with the vehicle. It is noted that the current condition may include one or more of a current time, a current weather, and a movement of the vehicle (e.g., a speed, a turning direction, a lane on which the vehicle is moving, etc.). When the determination of step S15 is affirmative, the processor 14 executes the alert action. In this embodiment, the processor 14 controls the output unit 13 of the driving assistance system 1 to output an alert (such as an alerting text, a warning sound, a speech that reads the alerting text out loud, etc.) associated with the message. Otherwise, the processor 14 may deem that no action is required, and the method is terminated. In other embodiments, the method may be implemented again after a predetermined time period (e.g., 500 milliseconds).

In step S16, the processor 14 identifies the condition included in the additional information, and determines whether at least part of the current condition fits at least part of the condition. In this embodiment, the processor 14 identifies the condition included in the additional information using the OCR model or other recognition techniques that are commercially available. When it is determined that at least part of the current condition fits at least part of the condition, the flow proceeds to step S17. Otherwise, the processor 14 may deem that no action is required, and the method is terminated. In other embodiments, the method may be implemented again after a predetermined time period (e.g., 500 milliseconds).

In step S17, the processor 14 determines whether an alert action is to be executed based on at least the message indicated by the traffic sign and the current condition associated with the vehicle.

Specifically, the operations of step S17 include that the processor 14 determines whether at least part of the current condition violates at least part of the message. When it is determined that at least part of the current condition violates at least part of the message, the processor 14 executes the alert action. In this embodiment, the processor 14 controls the output unit 13 of the driving assistance system 1 to output an alert (such as a text, a warning sound, etc.) associated with the message. Otherwise, when it is determined that no part of the current condition violates the message, the processor 14 may perform the determination again after a predetermined time period (e.g., one second), or to initiate the method again.

Figure 3:
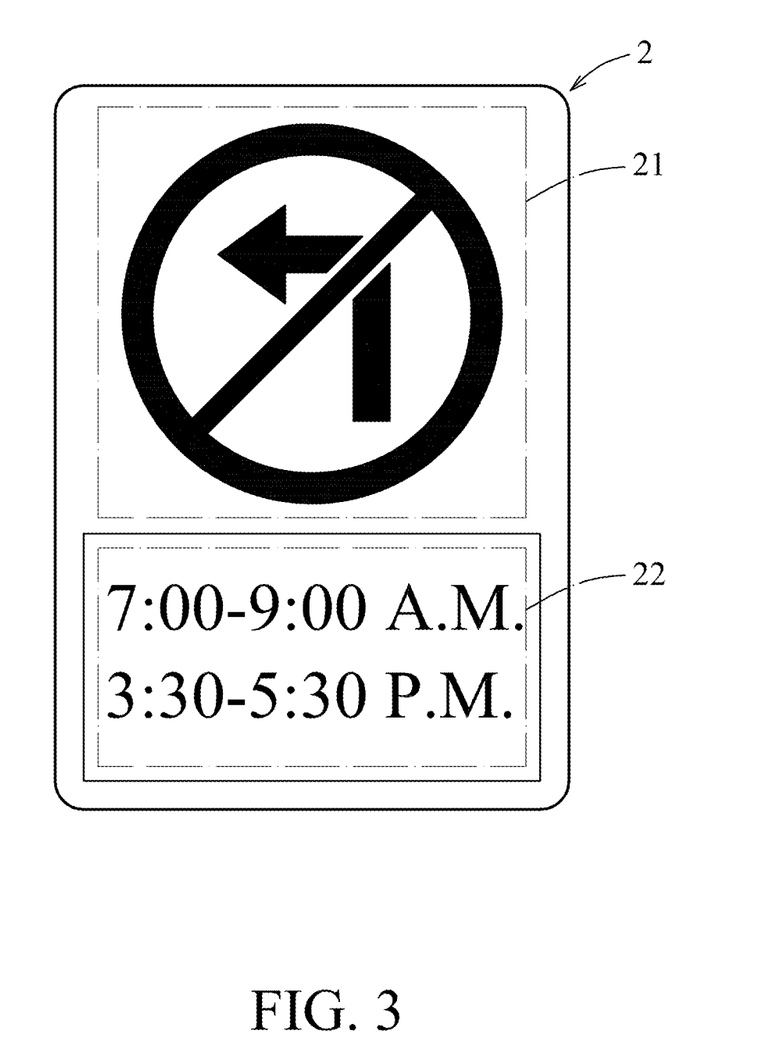
FIG. 3 is a schematic diagram of an exemplary traffic sign.

In use, when the vehicle is moving, a traffic sign 2 as shown in FIG. 3 may be detected by the image capturing unit 11. The traffic sign 2 may include a graphic part 21 that indicates a message (e.g., "left turn is prohibited"), and a text part 22 that indicates a condition associated with the message (e.g., the specified time periods 7:00 to 9:00 AM and 3:30 to 5:30 PM, during which left turn is prohibited).

As such, the processor 14 determines in step S13 that a traffic sign is detected, determines the message (i.e., left turn is prohibited), and the flow proceeds to step S14 to determine whether additional information indicating a condition associated with the message is detected in or in proximity to the traffic sign 2. When the text part 22 is detected, the flow goes to step S16.

In step S16, the processor 14 identifies the condition included in the additional information. Then, the processor 14 determines whether the current time is within a specified time period defined in the condition (i.e., 7:00 to 9:00 AM or 3:30 to 5:30 PM). When the determination is negative, it means that left turn is allowed at the current time, and the method may be terminated. When the determination is affirmative, the flow proceeds to step S17 to determine whether a movement of the vehicle indicates that the vehicle is undertaking the prohibited action (left turn), and to prompt execution of the alert action when the movement of the vehicle violates the message (i.e., the vehicle is making a left turn). In this embodiment, the determination may be performed by looking up various parameters from different components of the vehicle, such as a steering wheel being turned counter-clockwise by, for example, more than a preset angle, a left turn directional light being activated, a pre-determined navigation route indicating a left turn is imminent, etc.

In other embodiments, different kinds of traffic signs may be detected. For example, when a speed limit traffic sign is detected, the message may be a maximum speed limit and/or a minimum speed limit, and the condition may be a classification of the vehicle (for example, the traffic sign may indicate speed limits imposed to light vehicles). In this case, the processor may first determine the classification of the vehicle (e.g., using original equipment manufacturer (OEM) data stored in the data storage 12) to determine whether the vehicle is classified as a light vehicle. When it is determined that the vehicle is classified as a light vehicle, the processor 14 may determine, based on a speedometer of the vehicle, whether the vehicle is moving faster than the maximum speed limit or slower than the minimum speed limit, and to prompt execution of the alert action when the movement of the vehicle violates at least part of the message (is moving faster than the maximum speed limit or slower than the minimum speed limit).

In another example, the condition may be a weather condition of the surrounding environment of the vehicle (for example, the traffic sign may indicate a maximum speed limit imposed in case of rain, fog, etc.). In this case, the processor 14 may first determine a current weather condition (e.g., controlling the communication unit 15 to communicate with a remote server to obtain the current weather condition) to determine whether the current weather condition is the weather condition specified by the additional information related to the traffic sign. When it is determined that the current weather condition meets the weather condition specified by the additional information related to the traffic sign, the processor 14 may determine, based on a speedometer of the vehicle, whether the vehicle is moving faster than the maximum speed limit, and to prompt execution of the alert action when the movement of the vehicle violates the message (i.e., is moving faster than the maximum speed limit).

In some examples, the message may be a size limit (e.g., a height, a width, etc.) and a weight limit. In such cases, the processor 14 may access the OEM data stored in the data storage 12 to determine whether the vehicle is within the size limit specified by the traffic sign.

Using the above method, the driving assistance system 1 may be configured to determine a message of a traffic sign detected while the vehicle is moving, and to determine a condition associated with message of the traffic sign. Afterward, the driving assistance system 1 may be configured to determine whether the current condition of the vehicle indicates that the vehicle may be performing a prohibited action, and to perform an alert action accordingly to notify the driver.

Figure 4:
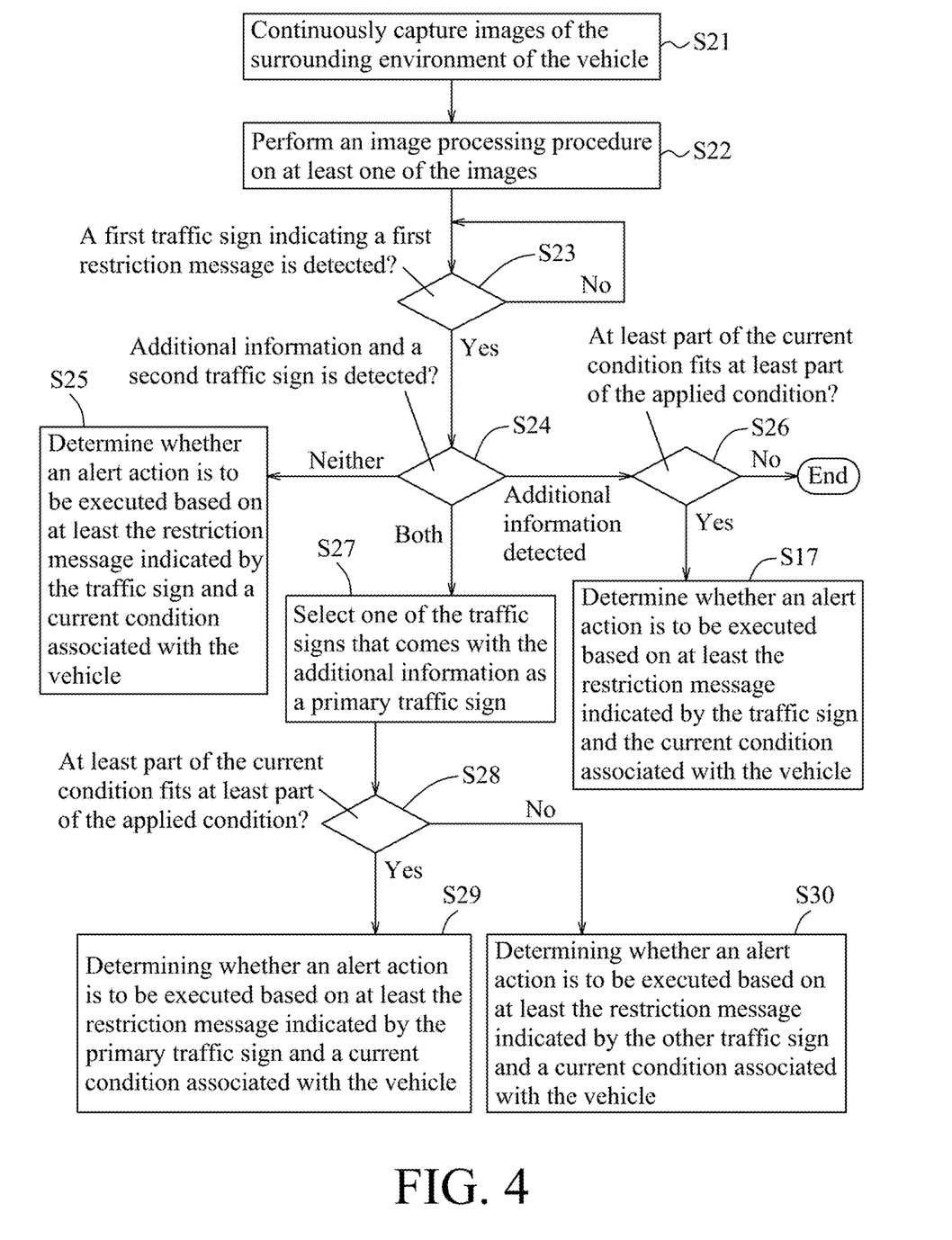
FIG. 4 is a flow chart illustrating steps of a method for providing driving assistance according to one embodiment of the disclosure.

FIG. 4 is a flow chart illustrating steps of a method for providing driving assistance according to one embodiment of the disclosure. In this embodiment, the method is implemented by the driving assistance system 1 as depicted in FIG. 1. It is noted that the steps of the method in this embodiment deal with the potential case that multiple traffic signs are detected in a same image.

In step S21, the processor 14 controls the image capturing unit 11 to continuously capture images of the surrounding environment of the vehicle.

In step S22, the processor 14 performs an image processing procedure on at least one of the images captured by the image capturing unit 11. Specifically, the processor 14 performs dynamic image recognition on at least one of the images to identify objects in the image(s) using the CNN model.

In step S23, the processor 14 determines whether a first traffic sign indicating a first message is detected. After it is determined that a first traffic sign is detected, the processor 14 may further identify the content of the first traffic sign (i.e., determine the message) using the OCR model or other recognition techniques that are commercially available. When the determination of step S23 is affirmative, the flow proceeds to step S24. Otherwise, the flow goes back to step S23 periodically to determine whether at least one traffic sign is detected in one of the images subsequently captured by the image capturing unit 11. For example, in this embodiment, when no traffic sign is detected, the processor 14 may perform the detection again after a predetermined time period (e.g., 500 milliseconds).

In step S24, the processor 14 determines whether additional information indicating a condition associated with the message is detected in or in proximity to the first traffic sign, and whether a second traffic sign indicating a second message is detected. Based on the determination of step S24, one of the steps S25 to S27 as described below may be implemented. In one example, the first traffic sign may indicate a maximum speed limit (i.e., the first message) with a condition, and the second traffic sign may indicate another maximum speed limit (i.e., the second message).

Specifically, in this embodiment, the processor 14 is first configured to define a detection range in said one of the images that is associated with the first traffic sign. In this embodiment, the detection range may be in a form of a circle with a center that coincides with a geometric center of the first traffic sign in the image. A size of the detection range is positively related to the size of the first traffic sign in the image. For example, the size of the detection range may be two times the size of the first traffic sign in the image. Then, the processor 14 determines whether the additional information and the second traffic sign are detected within the detection range. In the case that no additional information and no additional traffic sign is detected, the flow proceeds to step S25, in which the processor 14 determines whether an alert action is to be executed based on at least the message indicated by the traffic sign and a current condition associated with the vehicle. It is noted that in this case, the operations of step S25 may be done by the processor 14 in a manner similar to that of step S15 (see FIG. 2).

In the case that additional information is detected and no additional traffic sign is detected, the flow proceeds to step S26, in which the processor 14 determines whether at least part of the current condition fits at least part of the condition. It is noted that in this case, the operations of step S26 may be done by the processor 14 in a manner similar to that of steps S16 and S17 (see FIG. 2).

In the case that both the additional information and the second traffic sign are detected, the flow proceeds to steps S27 and S28, in which the processor 14 selects one of the first traffic sign and the second traffic sign as a to-be-dealt-with traffic sign.

Figure 5:
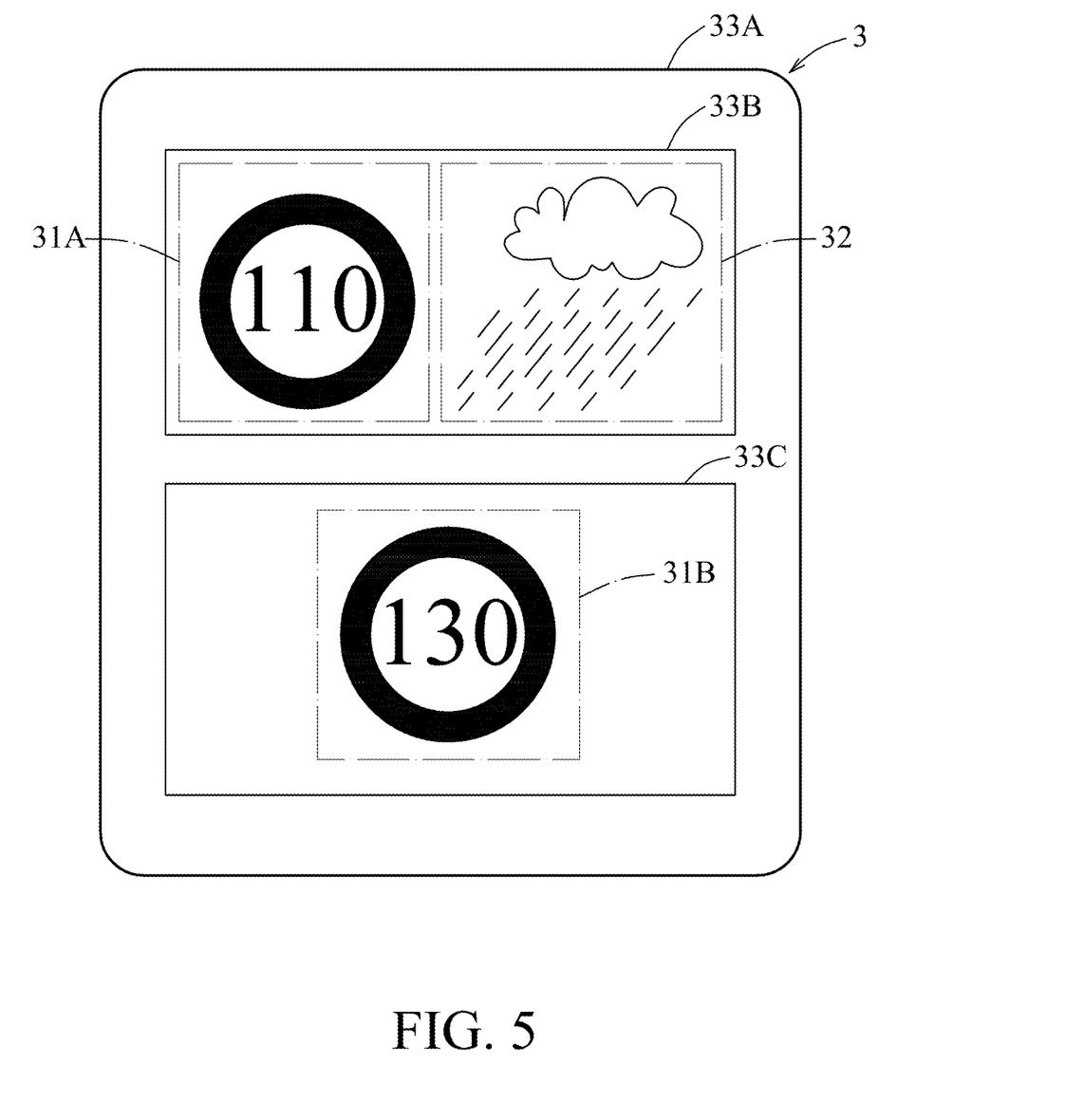
FIG. 5 is a schematic diagram of an exemplary set of traffic signs.

Specifically, the detected traffic signs may be in the form of a set of traffic signs 3 as shown in FIG. 5. The set of traffic signs 3 includes a first traffic sign 31A, a second traffic sign 31B, and an image 32. The first traffic sign 31A and the second traffic sign 31B may be associated with a first message (e.g., a maximum speed limit or a minimum speed limit) and a second message (e.g., a different maximum speed limit or a different minimum speed limit), respectively. The image 32 may include graphic information that constitutes a condition (e.g., a specific weather condition) and may be associated with one of the first traffic sign 31A and the second traffic sign 31B. In other embodiments, the image 32 may contain characters (such as texts and numbers) that provide additional information.

It is noted that in this example, each of the first traffic sign 31A, the second traffic sign 31B and the image 32 is enclosed by broken lines (which may not actually be present on the traffic signs).

In this embodiment, the processor 14 selects one of the traffic signs that comes with the additional information (i.e., the first traffic sign 31A) as a primary traffic sign in step S27. Afterward, the flow proceeds to step S28, in which the processor 14 determines whether at least part of the current condition fits at least part of the condition. For example, in the case where the set of traffic signs 3 is detected and the condition indicates a raining weather, the processor 14 may access a remote server to obtain the current weather condition to determine whether the current weather condition is the weather condition specified by the image 32 (i.e., raining weather).

When it is determined that the current weather condition is the weather condition specified by the image 32, the flow proceeds to step S29, in which the processor 14 may determine, based on a speedometer of the vehicle, whether the vehicle is moving faster than the maximum speed limit indicated by the first traffic sign 31A (110 kilometers per hour), and prompt execution of the alert action when the movement of the vehicle violates the first message (the vehicle is moving at a speed exceeding 110 kilometers per hour). In other words, when the determination of step S28 is affirmative, then step S29 is performed with respect to the primary traffic sign which serves as the to-be-dealt-with traffic sign.

On the other hand, when it is determined in step S28 that the current weather condition is not the weather condition specified by the image 32, the flow proceeds to step S30, in which the processor 14 may determine, based on a speedometer of the vehicle, whether the vehicle is moving faster than the maximum speed limit indicated by the second traffic sign 31B (130 kilometers per hour), and prompt the execution of the alert action when the movement of the vehicle violates the second message (the vehicle is moving at a speed exceeding 130 kilometers per hour). In other words, when the determination of step S28 is negative, then step S30 is performed with respect to the second traffic sign which serves as the to-be-dealt-with traffic sign.

In some examples, in processing the detected set of the traffic signs 3, when it is determined that the messages of the first traffic sign 31A and the second traffic sign 31B are of the same kind (e.g., both are maximum speed limits), and the condition typically indicates that the relevant message would be more restrictive (e.g., typically, a lower maximum speed limit applies for a raining weather or foggy weather than a good (normal) weather), the processor 14 may directly select the traffic sign that is associated with the more restrictive message (e.g., a lower one of the maximum speed limits, which may be 110 kilometers per hour) as the primary traffic sign in step S27, and to subsequently perform steps S28 to S30 accordingly.

It is noted that while in this embodiment, the first traffic sign 31A and the second traffic sign 31B may not be detected in the same time instance, the processor 14 is still capable of correctly selecting one of the first traffic sign 31A and the second traffic sign 31B as the primary traffic sign based on the condition, and of using one of the traffic signs that is applicable to the current condition of the vehicle to determine whether to perform the alert action. That is to say, under normal (e.g., not raining and not foggy) weather conditions, the processor 14 is programmed to determine whether the vehicle is moving faster than 130 kilometers per hour, and on a rainy day, the processor 14 is programmed to determine whether the vehicle is moving faster than 110 kilometers per hour.

In one embodiment, the operations of step S27, in which the processor 14 selects one of the first traffic sign and the second traffic sign as the primary traffic sign, may be performed in a different manner from that previously described.

Specifically, in such embodiment, the processor 14 determines whether one of the traffic signs is enclosed together with the additional information by a visible border and the other traffic sign is not enclosed within the visible border. In such a case, the processor 14 may select the one of the traffic signs that is enclosed together with the additional information by a visible border as the primary traffic sign. Using the set of traffic signs 3 as shown in FIG. 5 as an example, when a visible border 33B that encloses the first traffic sign 31A and the image 32, and a visible border 33C that encloses the second traffic sign 31B are detected, the processor 14 may select the first traffic sign 31A, which is assumed to be associated with the image 32 (and therefore the additional information), as the primary traffic sign.

According to one embodiment of the disclosure, there is provided a computer program product including instructions that, when executed by a processor of an in-vehicle driving assistance system, cause the processor to perform steps of a method for providing driving assistance, as described in any of the above embodiments. The computer program product may be stored in a non-transitory computer readable storage medium (such as a flash drive, a compact disc, a cloud drive, etc.).

According to some embodiments, the driving assistance system 1 may be configured to obtain the current weather via one of a number of ways without communicating with the external servers. For example, the processor 14 may be programmed to determine the current weather by executing the image processing procedure, which may be programmed to determine the current weather based on the images captured by the image capturing unit 11. Alternatively, the processor 14 may be programmed to determine the current weather by detecting states of some components of the vehicle, such as whether a windscreen wiper is activated, whether a windshield has raindrops thereon, etc. It is noted that the determination of the current weather based on the images may be available in the related art, so details thereof are omitted herein for the sake of brevity.

In another case, the determination in step S28 may be initially made based on the current weather obtained from the remote server. When it is determined that the current weather fits the condition (i.e., is raining, snowing, foggy, etc.), the flow proceeds to step S29. On the other hand, when it is determined that the current weather does not fit the condition (i.e., is sunny, cloudy, etc.), the processor 14 may further determine the current weather based on the states of some components of the vehicle and/or the result of the image processing procedure. When the further determination also indicates that the current weather does not fit the condition, the flow proceeds to step S30. On the other hand, when the further determination indicates that the current weather fits the condition, the flow proceeds to step S29.

In this manner, the flow of the above embodiment may serve to double check on the information obtained from the remote server, so as to eliminate the potential situation that the current weather obtained from the remote server is not the same as the weather actually experienced by the vehicle.

In those cases, the driver may manually switch to adopt the above manner for implementing the determination. In the above cases, some of the operations in the method may be done more efficiently and cost effectively since the need for external input (e.g., the current weather from the remote servers) may be eliminated, and may be implemented using the components that are already present in the vehicle (that is, no additional component is needed to be installed in the vehicle).

To sum up, the embodiments of the disclosure provide a method, a system and a computer program product that is capable of capturing images of a traffic sign on the road, identifying the message and the relevant condition associated with the traffic sign, and determining whether the current condition of the vehicle violates the message. When the determination is affirmative, an alert action is executed, which may include outputting an alerting text, a warning sound, a speech that reads the alerting text out loud, etc., for alerting the user of the vehicle. In this manner, the user may be more focused on driving itself and less distracted by the need to look at the traffic signs.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method for providing driving assistance, the method being implemented using a driving assistance system that includes a processor and an image capturing unit, and comprising steps of:
a) controlling, by the processor, the image capturing unit to continuously capture images of surrounding environment of the vehicle;
b) performing, by the processor, an image processing procedure on at least one of the images captured by the image capturing unit:
c) determining, by the processor, whether a traffic sign indicating that a message is detected in the at least one of the images:
d) when the determination in step c) is affirmative, determining, by the processor, whether additional information indicating a condition associated with the message is detected with respect to the traffic sign;
e) determining, by the processor, whether an alert action is to be executed based on at least the message indicated by the traffic sign and a current condition associated with the vehicle, the current condition including one of a current time, a current weather, a movement of the vehicle, and any combination thereof; and
f) when the determination in step e) is affirmative, executing, by the processor, the alert action;
wherein step e) includes determining whether at least part of the current condition fits at least part of the condition, and when it is determined that at least part of the current condition fits at least part of the condition, determining whether at least part of the current condition violates at least part of the message, and determining an alert action is to be executed when at least part of the current condition violates at least part of the message; and wherein step f) includes controlling an output unit of the driving assistance system to output an alert associated with the message, further comprising, between steps d) and e):
g) when a plurality of traffic signs are detected in the at least one of the images in step c) and additional information associated with one of the traffic signs is detected with respect to the one of the traffic signs in step d), selecting one of the traffic signs as a to-be-dealt-with traffic sign;
wherein step e) is performed with respect to the to-be-dealt-with traffic sign wherein step g) includes:
when it is determined that one of the traffic signs is enclosed together with the additional information within a visible border and other one of the traffic signs is not enclosed within the visible border, performing step e) with respect to the one of the traffic signs serving as the to-be-dealt-with traffic sign.

2. The method of claim 1, wherein step d) includes:
defining a detection range in the at least one of the images that is associated with the traffic sign, a size of the detection range being positively related to a size of the traffic sign in the at least one of the images; and
determining whether the additional information is detected within the detection range.

3. The method of claim 1, wherein step g) includes:
selecting one of the traffic signs with the additional information as a primary traffic sign;
determining whether at least part of the current condition fits at least part of the condition;
when the determination is affirmative, performing step e) with respect to the primary traffic sign serving as the to-be-dealt-with traffic sign; and
when the determination is negative, performing step e) with respect to the other traffic sign serving as the to-be-dealt-with traffic sign.

4. The method of claim 1, the messages for the traffic signs including speed limits, the additional information including a specific weather condition, wherein step g) is performed by comparing the current weather with the specific weather condition, and using the one of the traffic signs with the additional information as the to-be-dealt-with traffic sign when the current weather fits the specific weather condition.

5. A driving assistance system comprising a processor and an image capturing unit connected to said processor, said processor being programmed to:
control said image capturing unit to continuously capture images of surrounding environment of the vehicle;
perform an image processing procedure on at least one of the images captured by said image capturing unit;
determine whether a traffic sign indicating a message is detected in the at least one of the images;
when the determination is affirmative, determine whether additional information indicating a condition associated with the message is detected with respect to the traffic sign;
determine whether an alert action is to be executed based on at least the message indicated by the traffic sign and a current condition associated with the vehicle, the current condition including one of a current time, a current weather, a movement of the vehicle, and any combination thereof; and
when the determination is affirmative, execute the alert action;
the driving assistance system further comprising an output unit, wherein:
in determining whether an alert action is to be executed, said processor is programmed to determine whether at least part of the current condition fits at least part of the condition, and when it is determined that at least part of the current condition fits at least part of the condition, to determine whether at least part of the current condition violates at least part of the message, and determine an alert action is to be executed when at least part of the current condition violates at least part of the message; and
in executing the alert action, said processor is programmed to control said output unit of the driving assistance system to output an alert associated with the message, wherein said processor is further programmed to, prior to determining whether an alert action is to be executed:
when a plurality of traffic signs are detected in the at least one of the images and additional information associated with one of the traffic signs is detected with respect to the one of the traffic signs, select one of the traffic signs as a to-be-dealt-with traffic sign;
wherein determining whether an alert action is to be executed is performed by said processor with respect to the to-be-dealt-with traffic sign.

6. The driving assistance system of claim 5, wherein in determining whether additional information is detected, said processor is programmed to:
define a detection range in the at least one of the images that is associated with the traffic sign, a size of the detection range being positively related to a size of the traffic sign in the at least one of the images; and
determine whether the additional information is detected within the detection range.

7. The driving assistance system of claim 5, wherein in selecting one of the traffic signs as a to-be-dealt-with traffic sign, said processor is further programmed to:
select one of the traffic signs with the additional information as a primary traffic sign;
determine whether at least part of the current condition fits at least part of the condition;
when the determination is affirmative, determine whether the alert action is to be executed with respect to the primary traffic sign serving as the to-be-dealt-with traffic sign; and
when the determination is negative, determine whether the alert action is to be executed with respect to the other traffic sign serving as the to-be-dealt-with traffic sign.

8. The driving assistance system of claim 5, the messages for the traffic signs including speed limits, the additional information including a specific weather condition, wherein in selecting one of the traffic signs as a to-be-dealt-with traffic sign, said processor is programmed to compare the current weather with the specific weather condition, and use the one of the traffic signs with the additional information as the to-be-dealt-with traffic sign when the weather fits the specific weather condition.

9. The driving assistance system of claim 5, wherein in selecting one of the traffic signs as a to-be-dealt-with traffic sign, said processor is programmed to:
when it is determined that one of the traffic signs is enclosed together with the additional information within a visible border and other one of the traffic signs is not enclosed within the visible border, determine whether an alert action is to be executed with respect to the one of the traffic signs serving as the to-be-dealt-with traffic sign.

* * * * *